UNITED STATES PATENT OFFICE.

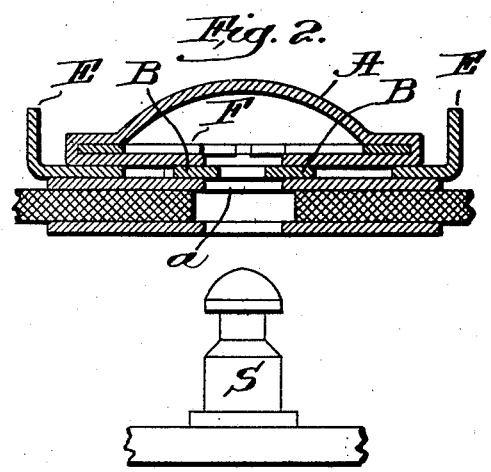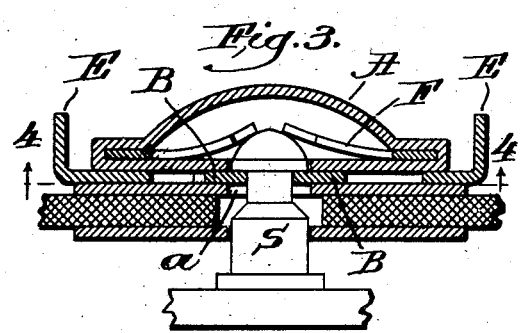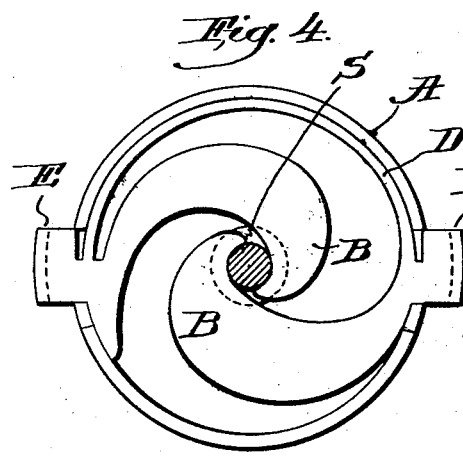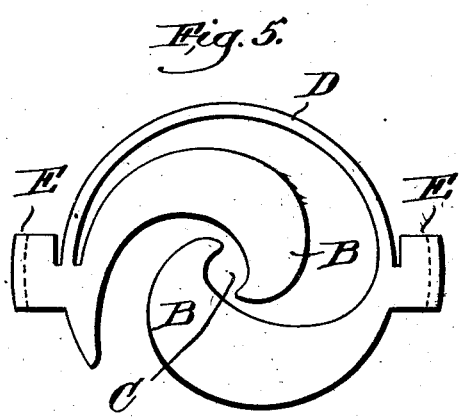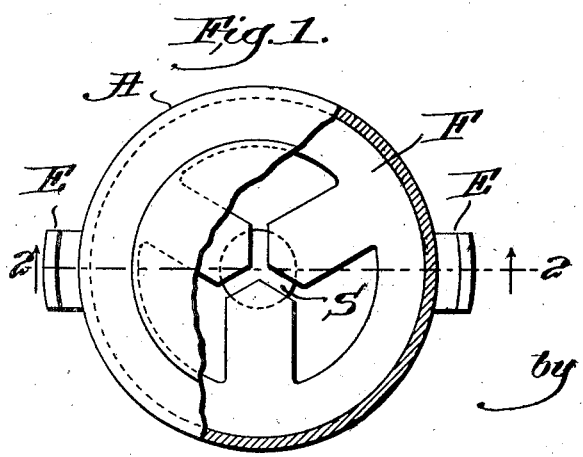

LOUIS ARKIN, OF BOSTON, MASSACHUSETTS.

FASTENER.

1,380,177.  Specification of Letters Patent.  Patented May 31, 1921.

Application filed April 10, 1920. Serial No. 372,877.

*To all whom it may concern:*

Be it known that I, LOUIS ARKIN, a citizen of the United States, and resident of Boston, in the county of Suffolk and State of Massachusetts, have invented new and useful Improvements in Fasteners, of which the following is a specification.

This invention relates to separable fasteners of the general class in common use as fasteners for gloves, dresses, automobile curtains and similar purposes. More particularly it relates to fasteners of the type shown and described in Letters Patent of the United States 1,225,741, granted to me on May 15, 1917, comprising essentially complemental stud and socket members the latter provided with stud retaining and releasing means and a resilient member adapted to be engaged and stressed by the stud upon its insertion into the socket and to force the stud from the socket without manipulation of the stud.

It is a great desideratum of these fasteners whatever be their use, that the socket member be as thin as possible and from a commercial standpoint this thinness is absolutely essential in fasteners adapted and intended for use upon dresses and similar articles of clothing for the reason that a fastener for this purpose must be thin enough to be wholly concealed by the material to which it is affixed and must not distort the dress or other article of clothing.

In the construction of fasteners according to my said Patent No. 1,225,741, the socket member of necessity includes a resilient member for forcing the stud from the socket as well as stud retaining means. The said resilient member occupies a relatively large space within the socket and the economy of space necessary to the essential thinness must therefore be obtained in the organization and arrangement of the stud retaining means. To accomplish this result it has heretofore been proposed to provide stud retaining means in the form of a pair of plates located and movable in the same plane pressed together and yieldingly held in normal position by a pair of springs fitted into notches in said plates. This construction attains the desired thinness but is unsatisfactory in service in that the manufacture of separate plates and springs is not economical of time or material and the assembling of the plates and springs within the socket is a painstaking, slow and therefore costly operation.

It is the principal object of this invention to provide stud retaining means peculiarly adapted for use in the type of fasteners described and which will obviate the objections and obtain the advantages of which I have spoken.

Referring to the drawings which illustrate an embodiment of the invention;

Figure 1 is a top view of the socket partly broken away;

Fig. 2 is a section on line 2—2 of Fig. 1, the stud member being shown in elevation disengaged from the socket;

Fig. 3 is a view similar to Fig. 2 but showing the stud engaged;

Fig. 4 is a section on the line 4—4 of Fig. 3;

Fig. 5 is a detail plan view of the improved stud retaining and releasing member.

A is a metal socket of usual contour having the usual stud receiving aperture $a$ which is slightly greater in diameter than the shank of the stud, S, so that said stud while freely movable into and out of said aperture is held against substantial lateral or tipping movement.

Within said casing is a stud retainer consisting of a pair of curved, hook-like stud retaining arms B disposed in the same plane in overlapping relation to provide therebetween a stud aperture C located in the path of the stud and into which it is adapted to enter upon its insertion into the casing. Said arms are connected one to the other by a resilient member or spring D disposed in the same plane as said arms and formed integral therewith, said spring and retaining arms being preferably stamped or struck from a single piece of material.

E are the stud releasers preferably formed integral with said retaining arms and extending outside said casing through slots provided for that purpose in the wall thereof. Said releases are preferably of the form shown having upturned ends (Fig. 2) which provide means for ready manipulation of the device in the manner hereinafter described.

Within said casing A and disposed above said retaining arms B, is a resilient member such as the spring plate F (Fig. 1) located in the path of the stud S and adapted to be engaged by said stud upon its insertion into said casing and to be stressed thereby. The stud S is formed with an enlarged head and a shank of smaller diameter than said head.

In this construction, as will be apparent, the stud retaining arms B and resilient connection D therebetween and the stud releasers E can be stamped or struck from a single piece of material and so form an integral unit. The unit thus provided is very economically manufactured and being a single piece greatly facilitates the ease and rapidity of assembly of the socket parts. Furthermore the formation of the resilient member or spring integral with the retaining arms eliminates the possibility of destruction of the fastener by the slipping or dislodgment of the arm actuating spring which not infrequently occurs in the older construction in which the retaining arms and their actuating spring are formed as independent elements.

The operation is as follows: When the stud S is inserted in the stud aperture $a$ of the casing its head enters the aperture C formed by the hook or curved retaining plates B and forcing said plates apart against the pressure of the spring D, passes between them and engages and stresses the resilient member F. When the stud head has thus passed therebetween, the spring D causes the arms B to close around the neck of the stud and said stud is thus retained within the casing with the resilient member F stressed thereby.

To release the stud, the releasers E are simultaneously pressed inward thus opening the retaining arms B a sufficient distance to permit the head of the stud freely to pass therebetween. Upon the completion of this opening movement the resilient member F is released and forces the stud from the socket.

A cardinal feature of the invention consists in the spiral shape of the arms B and their tangential junction with the opposite ends of the semi-circular spring D, whereby the arms B and releasers E have a common junction with the spring D at points diametrically opposite the points of engagement of the arms B with the stud S. Referring to Fig. 5, the right-hand arm B and the right-hand end of spring D join tangentially in opposite directions, the end of right-hand arm B being directed upwardly or in a counter-clockwise direction and the right-hand end of spring D being directed downwardly or in a clockwise direction and the left-hand arm B and the left-hand end of spring D join tangentially in the same direction, the end of left-hand arm B and the left-hand end of spring D both being directed downwardly or in a counter-clockwise direction.

I claim:

1. A socket member of a fastener comprising a casing having a stud receiving aperture, a pair of stud retaining arms curved around opposite sides of said aperture within the casing, a curved spring within the casing, and a pair of stud releasers extending through the casing, one of said arms and one of said releasers having a common junction with said spring on one side of said aperture and the other of said arms and the other of said releasers having a common junction with said spring on the other side of said aperture.

2. A socket member of a fastener comprising a casing having a stud receiving aperture, a semi-circular spring disposed in said casing substantially concentrically with said opening, stud retaining arms fast to the ends of said spring respectively, and curving around opposite sides of said aperture, and stud releasers extending from the ends of said spring outwardly through said casing.

3. A stud retainer for snap fasteners comprising a curved spring having approximately circular curvature, and spirally shaped stud retaining arms connecting approximately tangentially with said spring at diametrically opposite positions.

4. A stud retainer for snap fasteners comprising a semi-circular spring, a pair of stud retaining arms spirally disposed relatively to the center of said spring, the outer end of one of said arms and one end of said spring joining tangentially in opposite directions and the outer end of the other of said arms and the other end of said spring joining tangentially in the same direction.

5. A stud retainer for snap fasteners comprising a semi-circular spring and stud retaining arms having their outer ends connecting approximately tangentially with the opposite ends of said spring respectively, the outer ends of said arms being directed in the same direction circumferentially of the spring, and said arms curving inwardly around opposite sides of the center of said spring.

Signed by me at Boston, Massachusetts, this eighth day of April, 1920.

LOUIS ARKIN.